United States Patent [19]

Kramer, Jr.

[11] Patent Number: 4,804,019

[45] Date of Patent: Feb. 14, 1989

[54] END ADAPTOR FOR FLEXIBLE CORRUGATED TUBE

[76] Inventor: Vance M. Kramer, Jr., 1913 Greendale Ave., Findlay, Ohio 45840

[21] Appl. No.: 14,273

[22] Filed: Feb. 12, 1987

[51] Int. Cl.$^4$ ............................................. F16L 9/16
[52] U.S. Cl. .................................. 138/109; 138/122; 285/175; 264/286
[58] Field of Search ............... 138/109, 121, 122, 173, 138/177, 178; 264/286; 285/175

[56] References Cited

U.S. PATENT DOCUMENTS

| | | |
|---|---|---|
| 2,754,138 | 7/1956 | Kramer . |
| 2,789,841 | 4/1957 | Kramer . |
| 2,832,096 | 4/1958 | Kramer et al. . |
| 2,879,953 | 3/1959 | Kramer . |
| 2,909,198 | 10/1959 | Kramer et al. . |
| 2,986,169 | 5/1961 | McCormick ........................ 138/109 |
| 3,155,757 | 11/1964 | Kramer et al. . |
| 3,349,005 | 10/1967 | Fried .................................. 138/109 |
| 3,635,255 | 1/1972 | Krammer . |
| 3,727,953 | 4/1973 | Martin et al. . |
| 3,797,865 | 3/1974 | Ballentine ........................... 138/109 |
| 3,809,522 | 5/1974 | Kramer . |
| 3,899,012 | 8/1975 | Sather . |
| 4,362,187 | 12/1982 | Harris et al. ....................... 138/109 |

Primary Examiner—James E. Bryant, III
Attorney, Agent, or Firm—Pearne, Gordon, McCoy & Granger

[57] ABSTRACT

A flexible corrugated tube containing an integral flared end adaptor is made by applying an uncured elastomer tube about a forming mandrel as well as a flared end mold. Corrugations having grooves and ribs generally exist along at least a portion of the forming mandrel usually in the form of a cured, corrugated elastomer sleeve. Optionally, a portion of the flared end mold also has corrugations thereon. A cord is wrapped about the uncured tube thereby pressing the cord into the grooves between the corrugated ribs. The elastomeric sleeve is then cured and the cord removed.

1 Claim, 3 Drawing Sheets

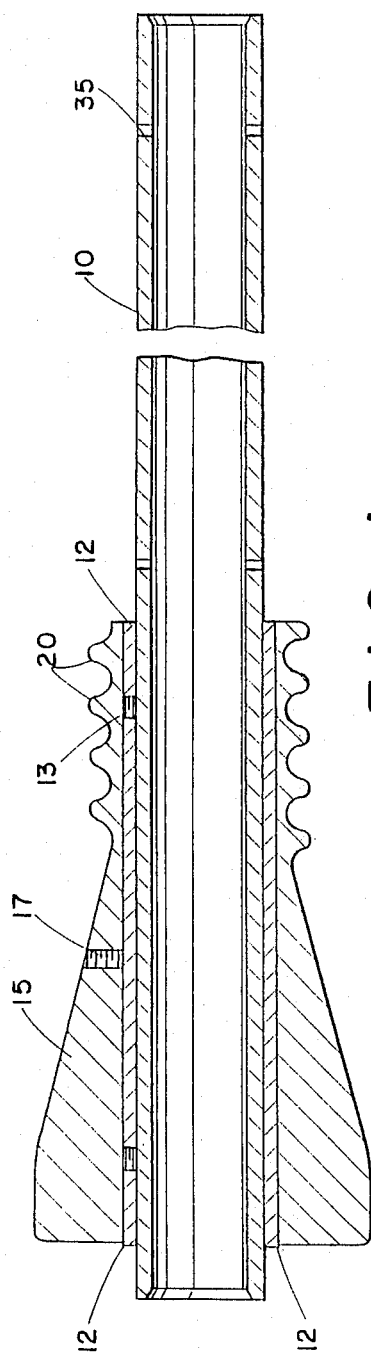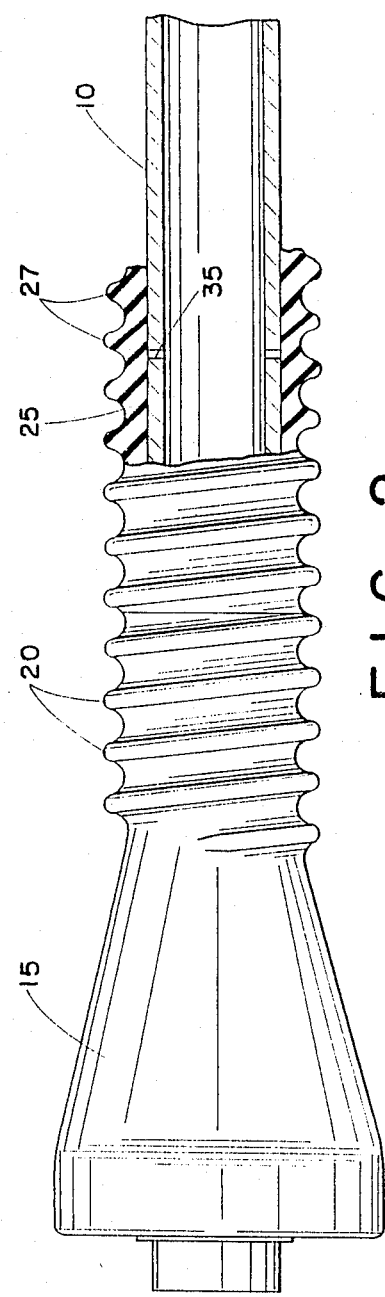

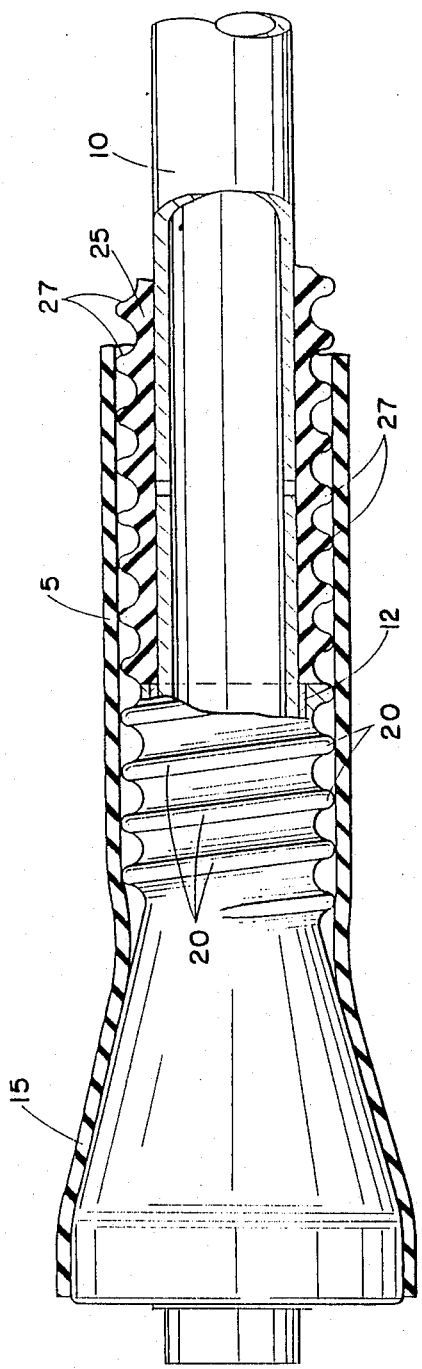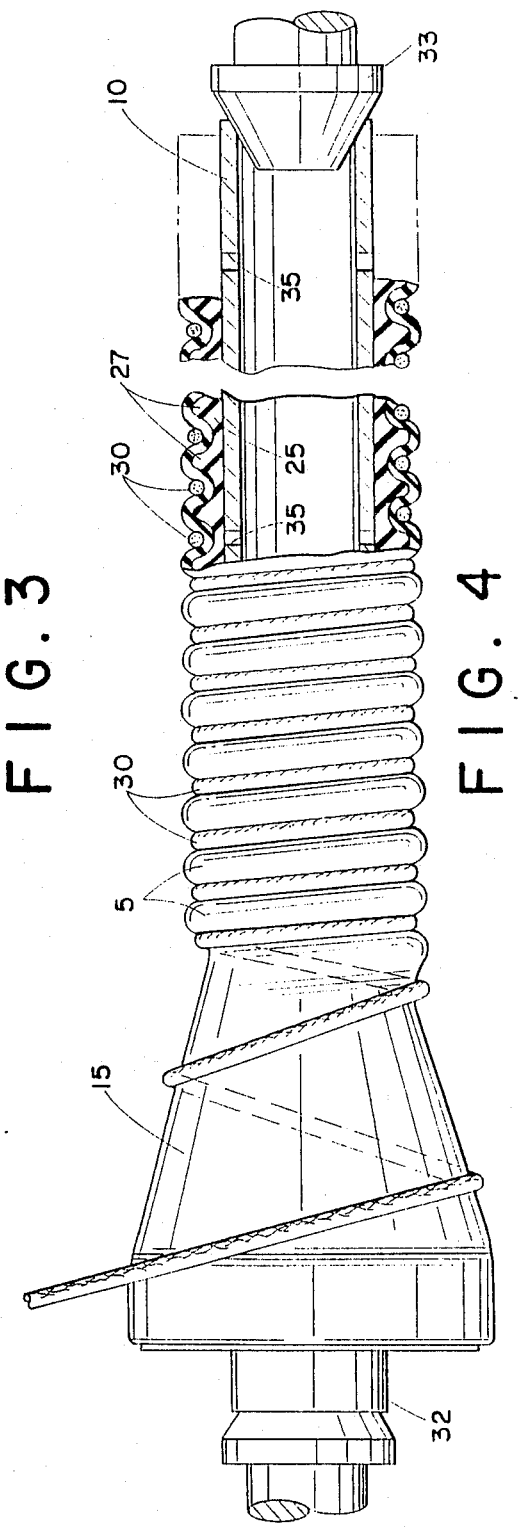

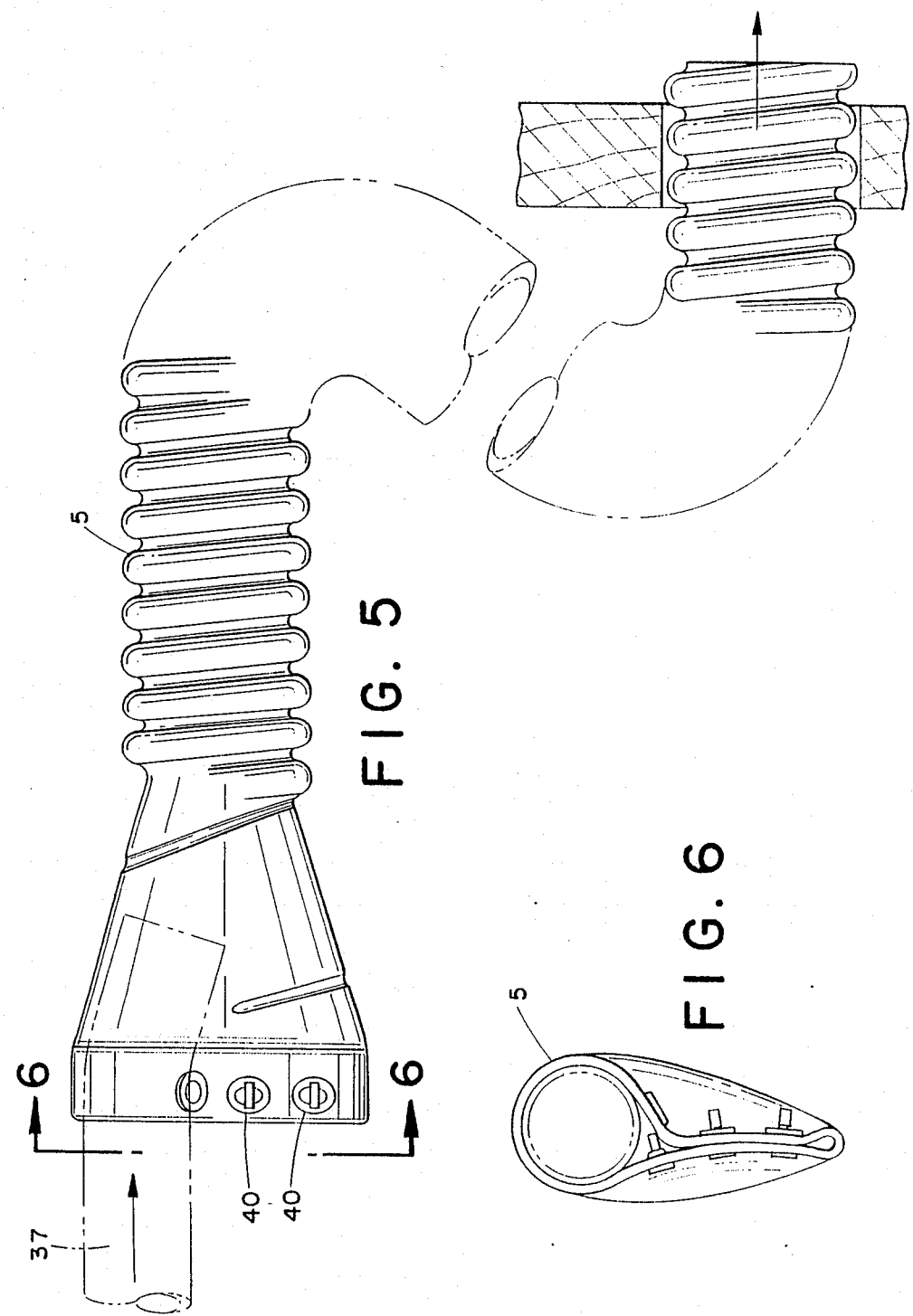

END ADAPTOR FOR FLEXIBLE CORRUGATED TUBE

FIELD OF THE INVENTION

The present invention relates to a method for forming a flexible corrugated tube having an integral end adaptor. More specifically, the present invention relates to wrapping a cord about an uncured elastomeric tube on a forming mandrel to form corrugations in the tube and curing the same in said corrugated state.

BACKGROUND

Heretofore, various flexible corrugated tubes have been made.

U.S. Pat. No. 2,754,138 to Kramer relates to a flexible adaptor booth tubing for carrying gaseous exhaust of motor vehicles.

U.S. Pat. No. 2,789,841 to Krammer relates to a flexible and deformable rubber tubing for attachment to the exhaust and tailpipe of motor vehicles to receive and carry off gaseous products of combustion.

U.S. Pat. No. 2,832,096 to Kramer relates to making a rubber tubing having a continuous spiral corrugation by a cording process in which a flexible tensile element or cord is wrapped spirally around rubber or other stock carried by an elongated rotatable mandrel, the pressing or squeezing of the stock against the mandrel by tension in the cord resulting in the formation of a spiral groove in the stock which is maintained during curing of the tube.

U.S. Pat. No. 2,879,953 to Kramer relates to a method and apparatus for unwrapping the cord used to bind and hold a rubber tube on a corrugated mandrel during vulcanization.

U.S. Pat. No. 2,909,198 to Kramer relates to spiral corrugated flexible rubber tubing which is provided with cylindrical end portions which constitute connectors for attaching the tubing to a cylindrical spigot of pipe.

U.S. Pat. No. 3,155,757 to Krammer relates to an apparatus and process for making tubing having a cylindrical end portion which constitutes a connector for attaching the tubing to a cylindrical spigot or pipe.

U.S. Pat. No. 3,635,255 to Krammer relates to a flexible corrugated hose having means integral therewith at one end for threaded connection to another similarly constructed length in end to end relation.

U.S. Pat. No. 3,727,953 to Martin relates to a flexible coupling for interconnecting ends of corrugated tubes of different cross-sectional diameters.

U.S. Pat. No. 3,809,522 to Krammer relates to an apparatus for making corrugated rubber tubing in which embryonic corrugations are formed in a sleeve of uncured rubber by sliding the sleeve axially into the annular space between a mandrel and a forming member having no moving parts that surrounds the mandrel and is in fixed, concentric relationship therewith.

U.S. Pat. No. 3,899,012 to Sather relates to a funnel having an elongated flexible spout whereby a cap is located on the flexible spout near its terminal end so that the cap can be snapped onto the funnel and keep the funnel and pouring nozzle clean.

The above patents generally do not relate to a method of making a corrugated tube having an integral flared end adaptor.

SUMMARY OF THE INVENTION

It is therefore an aspect of the present invention to provide a method for making a flexible corrugated tube having an integral flared end adaptor.

It is another aspect of the present invention to provide a flexible corrugated tube, as above, in which the adaptor can be of any size or configuration and in which the corrugations can be in the form of a helix.

It is still another aspect of the present invention to provide a flexible corrugated tube, as above, which is readily and efficiently made and which is suitable for exhausting gaseous materials from buildings, as for examples automobile exhaust from a garage.

It is yet another aspect of the present invention to provide a flexible corrugated tube, as above, wherein an uncured elastomeric tube is placed about said adaptor and a forming mandrel having corrugations thereon and conformed thereto by wrapping a cord about said uncured tube.

These and other aspects of the present invention will become apparent from the following detailed description.

In general, a method for making an integral end adaptor and flexible corrugated tube comprises the steps of applying at least one corrugated sleeve to a forming mandrel containing an end mold thereon, applying an uncured elastomer tube over said corrugated sleeve and said end mold, cording said uncured tube to said corrugated sleeve, and curing said corded sleeve so that a flexible corrugated tube having an integral end adaptor is formed.

BRIEF DESCRIPTION OF THE DRAWINGS

FIG. 1 is a cross-sectional view showing a forming mandrel having a flared end mold thereon.

FIG. 2 is a side elevation view showing a formal mandrel having a cured corrugated rubber sleeve thereon and a flared end mold.

FIG. 3 is a partial cross-sectional view and a partial side elevation view similar to FIG. 2 showing an uncured elastomer tube applied about the flared end mold and the corrugated sleeve.

FIG. 4 is a partial cross sectional view and a partial side elevation view, similar to FIG. 3 showing a cord applied to the uncured tube, whereby the tube is pressed into contact with the corrugated sleeve.

FIG. 5 is a side elevation view showing the flared end adaptor attached to an exhaust pipe and the remaining tube end extending through a wall.

FIG. 6 is an end view taken on lines 6—6 of FIG. 5.

DESCRIPTION OF THE INVENTION

According to the concepts of the present invention, a method for making a flexible corrugated tube having an integral flared end adaptor is provided. The corrugated tube, generally indicated by the numeral 5, is placed about forming mandrel 10. The forming mandrel can be made out of any suitable material such that it can withstand the curing temperature of the tube material which desirably is an elastomer. Hence, mandrel 10 can be made out of a plastic having a high melting point or more suitably a metal such as steel. The length of the mandrel is generally such that a desired tube length can be made thereon, as for example 5 feet, 10 feet, 30 feet, etc. The mandrel is generally in the form of a pipe or hollow cylinder. The mandrel serves as a substrate or base for the forming method of the present invention.

An optional mandrel sleeve 12 resides about one end of forming mandrel 10 and can slidably or movably engage the same. Once the sleeve has been inserted and positioned, it is generally fixedly attached thereto through any suitable fastener means such as set screw 12.

A metal core or flared end mold 15 resides upon either forming mandrel 10 or said optional mandrel sleeve 12 when such is utilized. Flared end mold 15 slidably and movably engages the forming mandrel and is located generally at one end thereof. Set screw 17 fixedly attaches the flared end mold either directly to the forming mandrell or indirectly thereto through the optional mandrell sleeve. Inasmuch as flared end mold 15 serves as a mold for forming the integral flared end adaptor, it generally has an increasing diameter in the direction of the axially end or outer portion thereof. However, the adaptor can generally have any shape, size, or configuration to produce a suitable or desired flared end adaptor.

As seen in the various drawings, the axially inner portion of the flared end mold generally has ribs or threads thereon which generally serve to produce corrugations 20 with tube 5. Corrugations 20 can also be of any size or shape and be nonconnected, that is a series of grooves or recesses between the ribs or threads, or connected as in the form of a helix. In the embodiment depicted in FIG. 1, the mold is connected to mandrel sleeve 12 which in turn is directly connected to the forming mandrel.

As seen in FIG. 2, a cured rubber sleeve 25 having various corrugations 27 thereon is applied to the mandrel to generally abut corrugations 20 of the flared end mold. Corrugations 27 of the cured rubber sleeve as with the mold corrugations, can generally be of any size and shape and exist as a series or as a plurality of separate grooves or recesses between ribs or threads or continuously be connected as in the form of a helix. Either a single or a plurality of corrugated cured rubber sleeves 25 are placed upon forming mandrel 10 to form a tube of a desired or suitable corrugated length. Inasmuch as tube 5 is generally stronger when it has corrugations thereon, the extent of cured rubber sleeves 25 is desirably the entire distance of the corrugated tube to be formed. It is to be understood, however, that sleever 25 need not be corrugated but rather can have smooth portions or sections thereon. Moreover, the sleeve need not extend along the entire length of the forming mandrel if a short length of corrugated tubing is desired. In lieu of a cured corrugated rubber sleeve 25, any other suitable desirably expandable or stretchable material can be utilized such as various elastomeric urethanes, and the like. The requirement of an expandable or stretchable material is so that corrugated sleeve 25 can be easily placed upon as well as removed from the forming mandrel.

Once a desired number of cured rubber sleeves 25 have been applied to the forming mandrel, an uncured elastomer tube 5 is applied thereover. The application, insertion, etc. of uncured tube 5 to the flared end mold and the cured rubber sleeves 25 can be accomplished in any suitable manner as by simply pulling the tube axially over sleeve 25. As shown in FIG. 3, the uncured sleeve is desirably pulled to the axial end of the flared end mold. The internal diameter of uncured elastomer tube 5 is generally equal to or slightly smaller than the exterior diameter of cured sleeve corrugations 27. In other words, a slight frictional engagement is generally desired. Uncured elastomer tube 5 at this state of the process is generally free of corrugations and the like as shown in FIG. 3.

Uncured tube 5 can be made of any elastomeric material such as urethane, rubber, and the like. Generally, rubber is desired with suitable materials including a rubber made from congugated dienes monomers having from 4 to 12 atoms, or such diene monomers in combination with vinyl substituted aromatic monomers having from 8 to 12 carbon atoms. Examples of specific monomers include butadiene, isoprene, pentadiene, styrene, alpha-methylstyrene, and the like. Uncured natural rubber can also be utilized.

According to the present invention, cord 30 is wrapped about uncured tube 5 with sufficient tension thereby forcing, pressing, or stretching tube 5 so that it resides within the grooves or recesses of the sleeve corrugations 27 as well as mold corrugations 20. Desirably, the diameter of the cord is sufficient so that portions of uncured tube 5 can be fully seated in grooves or recesses. Hence, the diameter of cord 30 is desirably smaller than any diameter or radius of curvature of the grooves. Inasmuch as the various corrugations are generally in the form of a helix, a single cord strand can be utilized to produce a corrugated rubber tubing 5. Should, however, a plurality of various grooves be utilized, then an individual cord strand is required for each groove or recess. The cord can be made out of any suitable material to withstand the curing temperatures of tube 5 and hence can be rope, twine, a high temperature melting plastic, and the like.

Uncured elastomer tube 5 is subsequently cured in any conventional manner by heating it to a suitable curing temperature as by placing the forming mandrel containing the uncured rubber sleeve thereon in an oven and maintaining the cure temperature for a suitable period of time. A suitable cure temperature will vary depending upon the particular elastomer and is well known to the art as well as to the literature.

Once tube 5 has been cured, cord 30 is unwound and removed with the net result being a flexible corrugated tube having corrugations substantially conforming to the shape or corrugations of rubber sleeve 25 having an integral flared end adaptor thereon. Although, according to the preferred mode, a flared end has been shown on only one end thereof, it is to be understood that the tube can have two such integral flared end adaptors, either of similar or different configurations. In order to remove cured corrugated elastomer tube 5 from the corrugated sleeve and adaptor, a pressurized fluid such as air pressure is usually injected into the hollow mandrel. The pressurized fluid, through ports 35, expands rubber sleeve 25. The ends of the mandrel are blocked during the sleeve expansion step with plugs 32 and 33 as shown in FIG. 4. The cured rubber tube and optionally the corrugated sleeve can then be pulled off of the flared end mold and the forming mandrel.

The end result is a flexible corrugated tube as shown in FIG. 5 having an integral adaptor on one, or both ends thereof. As previously noted, the corrugations provide strength to the cured tube and facilitate bending thereof. As shown in FIG. 5, the flared end adaptor can be connected to exhaust pipe with the remaining end of the cured tube being extended through a wall aperture. Thus, the flexible corrugated tube of the present invention can be utilized in an automotive service garage to transport the exhaust gases of a vehicle outside of the building.

In order to ensure a snug fit about the exhause pipe, a plurality of apertures 40 can exist about the perimeter or along an arc of the integral flared end adaptor and securely joined together by a fastener, for example, a screw and a nut, see FIG. 6. A fluid tight connection can thus be achieved.

From the foregoing description of the invention, it will be evident that the invention provides an improved method and apparatus from the manufacture of a flexible corrugated elastomer tube. The tubing can be utilized in any situation to transfer fluids from one location to another wherein a tube or hose adaptor is required. The fluids can be liquid such as water, various chemicals, or the like, or a gas such as the exhaust from an internal combustion engine, and the like.

While the best mode and preferred embodiment have been described in detail in accordance with the Patent Statutes, the invention is not limited thereto, but rather by the scope of the attached claims.

What is claimed is:

1. In a flexible corrugated tube having a major axial length portion and, an one end, an integral, outwardly flared end adapter of frustoconical form, the major length portion having both internal and external helical ridges and grooves, the improvement wherein said tube is made by:
   placing a sleeve of uncured rubber on a forming mandrel having a main, axially extending outer surface portion defining an external helical groove and at one end, axially aligned with said main surface portion, an end mold with a frustoconical, axially outward portion having a flared, relatively smooth outer surface and an axially inward portion defining an external helical groove that registers with and has the same diameter, pitch, and width as the external helical groove on the main surface portion, the sleeve being placed about the end mold for the entire axial length thereof;
   wrapping a flexible cord around the uncured sleeve along the main surface portion of the mandrel and the inward portion of the end mold to press the sleeve into the helical grooves so that axial length portions of the sleeve conform to the helical grooves and another axial length portion conforms to said smooth frustoconical outer surface of said axially outward portion of said end mold to define a smooth flared end of said sleeve wherein both the interior and exterior surfaces of the flared end are smooth; and
   thereafter curing the partially corded, uncured sleeve while on the mandrel to set the flared end and the helical corrugations and to form a flexible tube with a helically corrugated major axial length portion and an outwardly flared frustoconical end adapter having a smooth exterior surface and a smooth interior surface on an axially outward length portion and exterior helical groove on an axially inward length portion.

* * * * *